3,565,923
PROCESS FOR THE MANUFACTURE OF 4,4'-DI-AMINO-1,1'-DIANTHRAQUINONYLENES
Maurice Grelat, Bettingen, Basel, and Max Jost, Basel, Switzerland, assignors to Ciba Limited, Basel, Switzerland, a company of Switzerland
No Drawing. Filed Dec. 1, 1967, Ser. No. 687,149
Claims priority, application Switzerland, Dec. 12, 1966, 17,709/66
Int. Cl. C09b 1/24
U.S. Cl. 260—367                          7 Claims

ABSTRACT OF THE DISCLOSURE

The present invention concerns a process for the manufacture of 4,4'-diamino-1,1'-dianthraquinonyl-3,3'-disulphonic acid, wherein a 1-amino-4-halogenanthraquinone-2-sulphonic acid is heated with a reducing agent especially hydroquinone in an aqueous medium in the presence of a catalytic quantity of copper or a copper compound.

---

It is known that 4,4'-diamino-1,1'-dianthraquinonylene can be obtained when a 1-amino-4-halogenanthraquinone-2-sulphonic acid is heated in an aqueous acid medium with metallic copper or with a copper compound which split off halogen (see German publish specification No. 1,205,215). This process admittedly provides excellent yields of the diaminoanthraquinonylene but has the disadvantage that at least 1 gram atom of copper is required for each gram mol of the 1-amino-4-halogenanthraquinone-2-sulphonic acid. These relatively large amounts of copper naturally have an unfavourable effect on the manufacturing cost of the final product.

This invention is based on the observation that 4,4'-diamino-1,1'-dianthraquinonylenes can be obtained by heating a 1 - amino - 4 - halogenanthraquinone - 2 - sulphonic acid with reducing agents in an aqueous medium in the presence of catalytic quantities of copper or copper compounds.

As the 1-amino-4-halogenanthraquinone-2-sulphonic acid the following may, for example, be used: 1-amino-4-chloranthraquinone - 2 - sulphonic acid, 1-amino-4-bromo-6- or -7-chloranthraquinone-2-sulphonic acid, 1-amino-4-bromo - 6,7 - dichloranthraquinone-2-sulphonic acid, 1-amino - 4 - bromanthraquinone-2,6-disulphonic acid, 1-amino - 4 - bromo-5-nitroanthraquinone-2-sulphonic acid, but especially 1-amino-4-bromanthraquinone-2-sulphonic acid.

The expression "catalytic quantities of copper or copper compounds" is to be understood to mean quantities which are significantly less than the stoichiometric quantities, for example 1–25 gram atoms for each 100 gram mols of the 1-amino-4-halogenanthraquinone-2-sulphonic acid. The use of larger amounts of catalyst is not advantageous.

Both metallic copper in powder form and also cuprous or cupric compounds may be used as catalysts. The following may for example be quoted as suitable copper compounds: cuprous oxide, cupric oxide, cuprous and cupric chlorides and bromides, cupric sulphate, nitrate and acetate, and copper-potassium-sodium tartrate complex salts.

As the reducing agents, organic reducing agents, for example, pyrocatechol, hydroquinone, toluhydroquinone, pyrogallol, phloroglucinol, gallic acid and 1,4-naphthohydroquinone-2-sulphonic acid may be used.

The reducing agent is advantageously not added to the reaction mixture all at once but in portions commensurate with the course of the reaction. The reaction takes place by heating in an aqueous medium to temperatures of between 50 and 100° C. The pH value is adjusted to an optimum value of between 3 and 9 during the reaction by adding substances having a basic reaction. The optimum value depends on the nature of the selected catalyst; it is for example between 5 and 7.5 when copper powder is used.

Under certain circumstances it is advisable to carry out the reaction under an inert gas.

The 4,4'-diamino-1,1'-dianthraquinonyl-3,3'-disulphonic acid which is produced in very good yield is advantageously precipitated from the reaction solution by adding an alkali metal salt for example sodium chloride or sodium sulphate. If necessary the reaction product can be further purified by dissolving it in hot water with application of the usual filter aids for example activated charcoal and kieselguhr, and again precipitating with alkali salts.

The 4,4' - diamino - 1,1' - dianthraquinonyl-3,3'-disulphonic acids obtainable in accordance with the process of the invention may be desulphonated by known methods to give the corresponding 4,4'-diamino-1,1'-dianthraquinonylene.

The following examples illustrate the invention.

EXAMPLE 1

40.4 parts of the sodium salt of 1-amino-4-bromanthraquinone-2-sulphonic acid, 1 part of copper powder and 500 parts of water are heated to 75° C. with the stirring, the pH value being adjusted to 3.2 by adding sulphuric acid. The suspension is stirred for a further 10 minutes at 75° C. and the air in the reaction vessel is simultaneously displaced by nitrogen. A first portion of 0.5 part of hydroquinone is then added at constant temperature. The pH value is brought to 7 by adding 2 N sodium hydroxide solution and is kept at between 6.5 and 7 during the entire reaction by further additions of sodium hydroxide, 0.5 parts of hydroquinone at a time being added at intervals of 15 minutes. After addition of a total of 6 parts of hydroquinone the mixture is stirred for a further 15 minutes. The resulting product is precipitated by adding 3% of anhydrous sodium sulphate calculated on the weight of the solution. The product is filtered at 30° C. and washed with a 2% sodium sulphate solution. The product is purified by dissolving in water at 90° C., treatment with activated charcoal and salting-out the hot-filtered solution by means of 2% of anhydrous sodium sulphate calculated on the weight of the solution. After filtering the suspension which is cooled to 25° C., washing with a 2% sodium sulphate solution and drying at 120° C., 26.7 parts of the disodium salt of 4,4'-diamino-1,1'-dianthraquinonyl-3,3'-disulphonic acid are obtained, corresponding to a yield of 82.5% of theory.

EXAMPLE 2

40.4 parts of the sodium salt of 1-amino-4-bromathraquinone-2-sulphonic acid, 2 parts of crystalline copper nitrate and 500 parts of water are heated to 75° C. with stirring and the pH value adjusted to 7.5–8 by adding 2 N sodium hydroxide solution. The air present in the reaction vessel is displaced by nitrogen and 0.5 part of hydroquinone at a time are added at intervals of 15 minutes the pH value being maintained at 7.5–8 by progressive addition of further sodium hydroxide solution. After addition of a total of 5.5 parts of hydroquinone the mixture is stirred for a further 30 minutes and the reaction mixture is worked-up as in Example 1. 25 parts of the disodium salt of 4,4' - diamino - 1,1' - dianthraquinonyl-3,3' - disulphonic acid are obtained, corresponding to a yield of 76% of theory.

EXAMPLE 3

1 part of cuprous bromide is suspended in 50 parts of water at 70° C. with stirring and cuprous oxide is precipitated by adding sodium hydroxide solution. After 5 minutes the precipitate is allowed to settle, decanted and then twice washed with water. The resulting cuprous oxide, 40.4 parts of the sodium salt of 1-amino-4-bromanthraquinone-2-sulphonic acid and 500 parts of water are stirred together at 75° C. under a nitrogen atmosphere. After adding 0.5 part of hydroquinone the pH value is adjusted to 5–5.5 by adding 2 N sodium hydroxide solution and is maintained at that value during the whole reaction, 0.5 part of hydroquinone at a time being added at intervals of 10 minutes. After adding a total of 7.5 parts of hydroquinone the mixture is stirred for a further hour at 75° C.

After working-up as described in Example 1, 25.3 parts of the disodium salt of 4,4'-diamino-1,1'-dianthraquinonyl-3,3'-disulphonic acid are obtained, corresponding to a yield of 78% of theory.

EXAMPLE 4

40.4 parts of the sodium salt of 1-amino-4-bromanthraquinone-2-sulphonic acid, 0.7 part of cuprous bromide and 500 parts of water are stirred together at 75° C. under a nitrogen atmosphere. After adjusting the pH value to 9 by means of 2 N sodium hydroxide solution, 0.5 part of hydroquinone are added. A further quantity of 0.5 part of hydroquinone at a time are added at intervals of 10 minutes and the pH value is maintained at between 7.5 and 8 by adding 2 N sodium hydroxide solution. After adding a total of 8.5 parts of hydroquinone the mixture is stirred for a further hour at 75° C. Working-up as described in Example 1 yields 21.4 parts of the disodium salt of 4,4'-diamino-1,1'-dianthraquinonyl-3,3'-disulphonic acid corresponding to a yield of 66% of theory.

EXAMPLE 5

40.4 parts of the sodium salt of 1-amino-4-bromanthraquinone-2-sulphonic acid, 0.7 part of cuprous bromide and 500 parts of water are stirred together at 75° C. under a nitrogen atmosphere, the pH value being adjusted to 8.5 to 9 by adding 2 N sodium hydroxide solution. After a first addition of 1 part of pyrocatechol the pH value is kept at between 7.5 and 8.2 throughout the entire reaction by adding 2 N sodium hydroxide solution, 1 part of pyrocatechol at a time being added at intervals of 10 minutes. After the fifth and eighth addition of pyrocatechol a further 0.15 part of cuprous bromide are added at each addition. In total, 10 parts of pyrocatechol are added. The mixture is thereafter stirred for a further hour at 75° C. and finally worked up as described in Example 1. In this way 20.6 parts of the disodium salt of 4,4' - diamono - 1,1' - dianthraquinonyl - 3,3' - disulphonic acid are obtained, corresponding to a yield of 63% of theory.

EXAMPLE 6

40.4 parts of the sodium salt of 1-amino-4-bromanthraquinone-2-sulphonic acid, 0.2 part of cuprous bromide and 500 parts of water are stirred together at 75° C. under a nitrogen atmosphere the pH value being adjusted to 7.5 to 8 by adding 2 N sodium hydroxide solution and maintained at that value throughout the entire reaction. After adding a first amount of 0.8 part of pyrogallol, further quantities of 0.8 part of pyrogallol are added at intervals of 1 hour, 0.2 part of cuprous bromide being added simultaneously with both the third and fourth addition of pyrogallol.

After adding a total of 4.8 parts of pyrogallol the mixture is stirred for a further 2 hours at 75° C. and the resulting 4,4' - diamino - 1,1' - dianthraquinonyl - 3,3'- disulphonic acid is finally separated and purified in the manner described in Example 1.

EXAMPLE 7

40.4 parts of the sodium salt of 1-amino-4-bromanthraquinone-2-sulphonic acid, 1 part of copper powder and 500 parts of water are stirred together at 75° C. under a nitrogen atmosphere, the pH value being adjusted to 3.0 by adding sulphuric acid. The first portion of 0.5 part of hydroquinone is added after 20 minutes. The pH value is brought to 3.1 in the first half hour and then to 3.6–4.0 by adding Amberlite IR–45, a weakly basic ion exchanger resin.

After the first addition of hydroquinone, further quantities of 0.5 part of hydroquinone at a time are added at intervals of 10 minutes. When a total of 6.5 parts of hydroquinone has been added the mixture is stirred for a further 2 hours at 75° C. The ion exchanger resin is separated by filtration and the disodium salt of 4,4'-diamino - 1,1' - dianthraquinonyl - 3,3' - disulphonic acid contained in the filtrate is separated and purified as described in Example 1. 19 parts of the disodium salt are obtained, corresponding to a yield of 58% of theory.

EXAMPLE 8

40.4 parts of the sodium salt of 1-amino-4-bromanthraquinone-2-sulphonic acid are dissolved in 500 parts of water at 80° C. with stirring and 2 parts of copper sulphate and 1 part of hydroquinone are added thereto. The pH value of the reaction mixture is adjusted to between 5.5 and 6 by dropwise addition of triethylamine and 9 portions each of 0.5 part of hydroquinone are added at intervals of 10 minutes. During this time the temperature is maintained at 80° C. and the pH value is kept at between 5.5 and 6 by adding triethylamine. The mixture is stirred for a further 1 hour at 80° C. at this pH value and then 20 parts of sodium sulphate and 30 parts of 10% sulphuric acid are added to the reaction mixture. The product is filtered cold and the residue is washed with a 2% sodium sulphate solution. The crude 4,4' - diamino - 1,1' - dianthraquinonyl - 3,3' - disulphonic acid is dissolved in 500 parts of water at 85° C. and clarified by filtration. The solution is mixed with 12 parts of sodium sulphate and filtered cold, the product is washed with a 2% sodium sulphate solution until it is light in color and then dried. The yield is 70% of theory.

EXAMPLE 9

1 part of copper powder is added at 80° C. to a solution of 40.4 parts of the sodium salt of 1-amino-4-bromanthraquinone-2-sulphonic acid in 500 parts of water and the pH value is adjusted to 3 by adding 10% sulphuric acid. The reaction mixture is stirred for 10 minutes at 80° C., mixed with pyridine, and the pH value adjusted to 5. 5.5 parts of hydroquinone are then added in portions during 90 minutes. After the last addition of hydroquinone the mixture is stirred for a further 60 minutes at 80° C. The pH value is kept constant at 5 throughout the entire reaction by dropwise addition of pyridine. After adding 12 parts of sodium sulphate and 30 parts of 10% sulphuric acid the mixture is allowed to cool, filtered, and the residue washed with a 2% sodium sulphate solution until the spent wash liquid is light red. The crude product is dissolved in 500 parts of hot water and filtered. The filtrate is mixed with 15 parts of sodium sulphate, allowed to cool, and the 4,4'-diamino-1,1'-dianthraquinonyl-3,3'-disulphonic acid is filtered and dried.

What is claimed is:

1. A process for the manufacture of 4,4'-diamino-1,1'-dianthraquinonyl-3,3'-disulphonic acid, wherein a 1-amino-4-halogenanthraquinone-2-sulphonic acid is heated with a polyhydroxybenzene as reducing agent in an aqueous medium in the presence of a catalytic quantity of copper powder, a copper salt or oxide.

2. A process as claimed in claim 1, wherein 1-amino-4-bromanthraquinone-2-sulphonic acid is used as the starting material.

3. A process as claimed in claim 1, wherein copper powder is used as the catalyst.

4. A process as claimed in claim 1, wherein a copper salt or oxide is used as the catalyst.

5. A process as claimed in claim 1, wherein at least 0.01 gram atom of copper powder or an equivalent amount of a copper salt or oxide is employed for each 1 gram mol of 1-amino-4-halogenanthraquinone-2-sulphonic acid.

6. A process as claimed in claim 1, wherein hydroquinone is used as the reducing agent.

7. A process as claimed in claim 1 which is carried out at a temperature of between 50 and 100° C.

References Cited

UNITED STATES PATENTS 3,234,242   2/1966   Jost et al. _____ 260—367

OTHER REFERENCES

Ullmann: Ber., 45, pp. 689–690 (1912).
Barnett: Anthracene and Anthraquinone, pp. 90–92 (1921).

LORRAINE A. WEINBERGER, Primary Examiner

E. J. SKELLY, Assistant Examiner